(12) United States Patent
Hajji et al.

(10) Patent No.: US 7,886,184 B2
(45) Date of Patent: *Feb. 8, 2011

(54) MULTIPLE SOURCING STORAGE DEVICES FOR ULTRA RELIABLE MIRRORED STORAGE SUBSYSTEMS

(75) Inventors: Amine M. Hajji, San Jose, CA (US); Joseph S. Hyde, II, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 469 days.

This patent is subject to a terminal disclaimer.

(21) Appl. No.: 12/106,267

(22) Filed: Apr. 19, 2008

(65) Prior Publication Data

US 2008/0215811 A1    Sep. 4, 2008

Related U.S. Application Data

(63) Continuation of application No. 10/876,976, filed on Jun. 24, 2004, now Pat. No. 7,376,862.

(51) Int. Cl.
*G06F 11/00* (2006.01)

(52) U.S. Cl. .................. 714/6; 714/42; 714/47

(58) Field of Classification Search ............ 714/6, 714/42, 47
See application file for complete search history.

(56) References Cited

U.S. PATENT DOCUMENTS

| 5,455,926 | A | | 10/1995 | Keele et al. |
|---|---|---|---|---|
| 5,491,810 | A | * | 2/1996 | Allen ..................... 711/117 |
| 5,794,244 | A | | 8/1998 | Brosch et al. |
| 5,870,537 | A | * | 2/1999 | Kern et al. ................ 714/6 |
| 5,901,327 | A | | 5/1999 | Ofek |
| 6,145,028 | A | | 11/2000 | Shank et al. |
| 6,304,980 | B1 | * | 10/2001 | Beardsley et al. .......... 714/6 |
| 7,039,777 | B2 | * | 5/2006 | Yamagami et al. ........ 711/162 |
| 7,376,862 | B2 | | 5/2008 | Hajji et al. |
| 2002/0053008 | A1 | | 5/2002 | Goodman et al. |
| 2003/0041211 | A1 | | 2/2003 | Merkey et al. |
| 2003/0051097 | A1 | | 3/2003 | Ottesen et al. |
| 2003/0074523 | A1 | | 4/2003 | Johnson |
| 2005/0222817 | A1 | | 10/2005 | Achacoso et al. |
| 2007/0079172 | A1 | * | 4/2007 | Rowe et al. ................ 714/6 |

\* cited by examiner

*Primary Examiner*—Robert Beausoliel
*Assistant Examiner*—Joshua P Lottich
(74) *Attorney, Agent, or Firm*—David W. Victor; Konrad Raynes and Victor LLP

(57) ABSTRACT

One aspect of the invention is a method for configuring an array of storage devices to reduce the probability of data loss due to clustered storage device failures in the array. An example of this method includes identifying all storage devices in a primary set of storage devices and a first mirror set of storage devices in the array of storage devices. This example also includes obtaining data regarding each identified storage device. This example further includes determining if any of the storage devices in the primary set of storage devices has a vital characteristic that is the same as a vital characteristic of any of the storage devices in the first mirror set of storage devices, and if so, indicating an array configuration error, and if not, continuing the configuration.

20 Claims, 10 Drawing Sheets

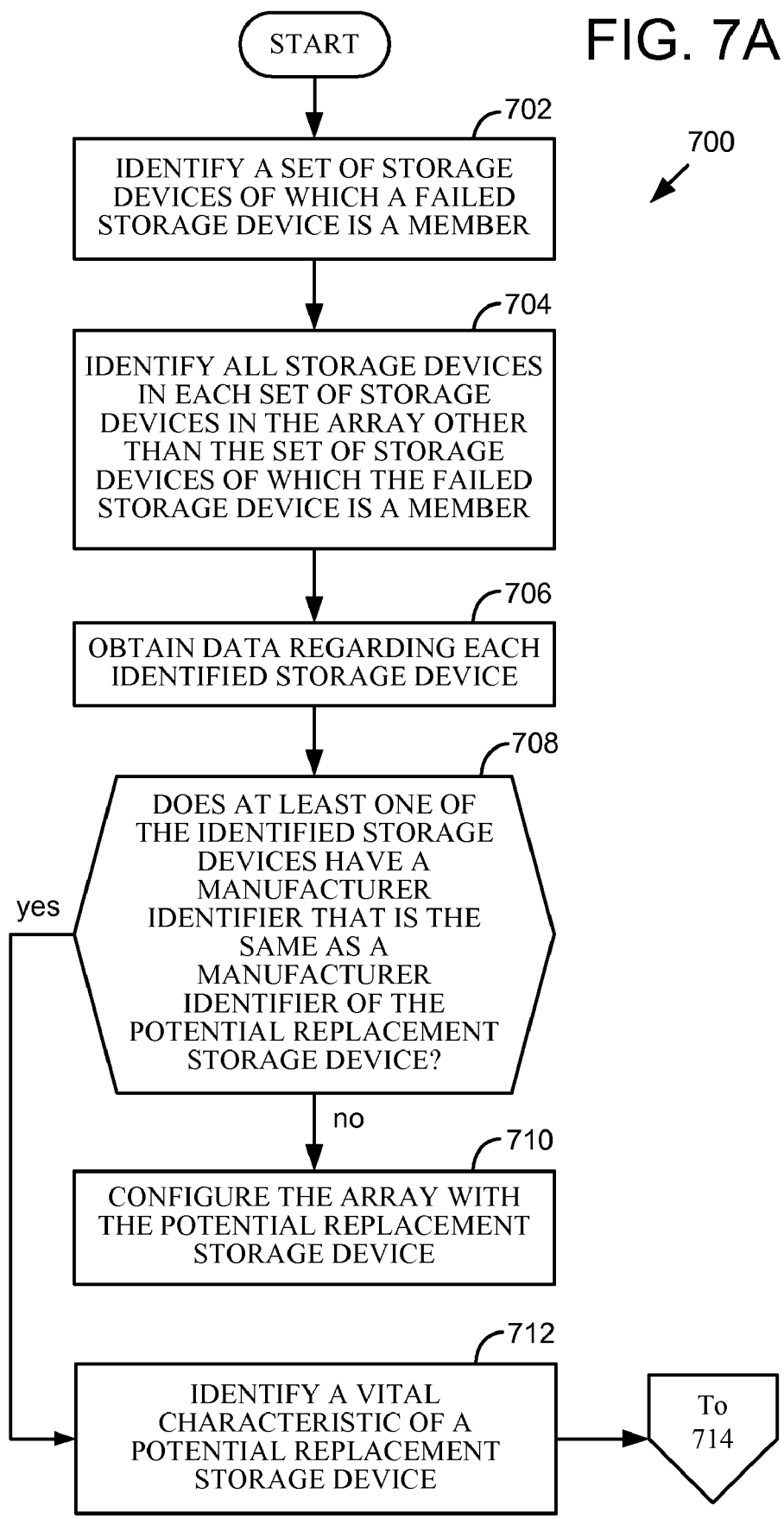

MULTIPLE SOURCING STORAGE DEVICES FOR ULTRA RELIABLE MIRRORED STORAGE SUBSYSTEMS

CROSS-REFERENCE TO RELATED APPLICATIONS

This application is a continuation of U.S. patent application Ser. No. 10/876,976, filed Jun. 24, 2004 now U.S. Pat. No. 7,376,862, titled "Multiple sourcing storage devices for ultra reliable mirrored storage subsystems", which is incorporated herein by this reference.

BACKGROUND

1. Technical Field

The present invention relates to providing protection from data loss in an array of storage devices. More particularly, the invention concerns reducing the probability of data loss due to clustered storage device failures in an array of storage devices.

2. Description of Related Art

Important data is often stored in storage devices in computing systems. Because storage devices can fail and data in failed storage devices can be lost, techniques have been developed for preventing data loss and for restoring data when one or more storage devices fail.

One technique for preventing data loss comprises storing parity information on a storage device (such as a disk drive), which is a member of a storage array, and storing data on one or more of the other storage devices in the array. (Herein a disk drive may be referred to as a "disk".) With this technique, if a storage device fails, parity information can be used to reconstruct the data that was on the failed storage device. Moreover, if sufficient parity information is added to another storage device, the additional parity information may be used to reconstruct data stored on more than one failed storage device.

Another technique for preventing data loss, called data mirroring, comprises making a duplicate copy of data on a separate storage device. With this technique, if a storage device fails, data can be restored from the copy of the data. Individual storage devices, or entire arrays of storage devices may be mirrored to protect data.

Data mirroring and parity information storage, or a combination of the two, may be implemented on a Redundant Array of Inexpensive (or Independent) Disks (RAID), which may be used to provide a data storage system that has increased performance and capacity. Also, a technique called striping may be utilized with RAID arrays, wherein data records and parity information are divided into strips such that the number of strips equals the number of disks in the array. Each strip is written or "striped" to each of the different disks in the RAID array, to balance the load across the disks and to improve performance. A group of strips comprising one pass across all of the drives in a RAID is called a stride. Several RAID protocols have been devised, wherein different mirroring, parity, and striping arrangements are employed. As an example, in a RAID 5 array consisting of six disks, five data strips and one parity strip are striped across the six disks, with the parity information rotated across the disks. The rotation of the parity across the disks ensures that parity updates to the array are shared across the disks. RAID 5 provides a redundancy of one (also called a Hamming distance), which means that all data can be recovered if any one and only one of the disks in the array fails.

Drive failures in general, and clustered failures in particular, are intrinsic characteristics of specific drive products, and are a function of design characteristics as well as a number of factors such as the quality of manufacture and the drive's sensitivity and reliability as function of environment and workload. Some designs are robust and have no clustering phenomena, while others exhibit problematic clustered failure characteristics. For example, some designs may be subject to simultaneous failures within a range of power on hours. Others may exhibit clustering with entirely different time scales and triggering mechanisms. For example, some designs may operate without problems but then become susceptible to clustered failures if power to the drives is cycled.

RAID schemes which provide higher data redundancy, such as RAID 6, RAID 51, Symmetric RAID (n+n), and double or higher mirroring are increasingly becoming necessary to reduce the probability of data loss as a consequence of normal drive failure rates. These higher codes generally require an increase in the number of disk drives, or alternately are achieved at a significant loss in effective capacity. For example, a user may opt to go from a 5 disk RAID 5 array to a 10 disk RAID 51 array wherein the RAID 5 array is mirrored. As another example, the storage efficiency for a RAID 6 array, for the same data storage capacity as a RAID 5 array, is lower than the RAID 5 array because a RAID 6 array requires an additional disk. RAID 6 has an arrangement similar to RAID 5, but requires two parity strips in each stride, to provide a redundancy of two. Although these RAID schemes provide increased protection from data loss, these schemes often do not provide sufficient redundancy to permit recovering from a clustering of failures for a particular drive product, wherein a number of drives fail simultaneously or during a short period of time. For example, although some of these RAID schemes provide a Hamming distance of up to 4, these schemes are not capable of addressing clustering failures when more than 3 drives fail in a short period of time. Consequently, known techniques are inadequate for preventing data loss when clustered storage device failures occur.

SUMMARY

One aspect of the invention is a method for configuring an array of storage devices to reduce the probability of data loss due to clustered storage device failures in the array. An example of this method includes identifying all storage devices in a primary set of storage devices and a first mirror set of storage devices in the array of storage devices. This example also includes obtaining data regarding each identified storage device. This example further includes determining if any of the storage devices in the primary set of storage devices has a vital characteristic that is the same as a vital characteristic of any of the storage devices in the first mirror set of storage devices, and if so, indicating an array configuration error, and if not, continuing the configuration.

Another aspect of the invention is a method for replacing a failed storage device in an array of storage devices having a plurality of sets of storage devices, to reduce the probability of data loss due to clustered storage device failures in the array. An example of this method includes identifying a set of storage devices of which the failed storage device is a member. This example also includes identifying all storage devices in each set of storage devices in the array other than the set of storage devices of which the failed storage device is a member. This example also includes obtaining data regarding each identified storage device. Additionally, this example includes identifying a vital characteristic of a potential replacement storage device. Further, this example includes determining if any identified storage device has a vital characteristic that is the same as the vital characteristic of the potential replacement storage device, and if so, indicating a array configuration error, and if not, configuring the array with the potential replacement storage device.

Other aspects of the invention are described in the sections below, and include, for example, a computing system, and a signal bearing medium tangibly embodying a program of machine-readable instructions executable by a digital processing apparatus to perform operations for configuring an array of storage devices to reduce the probability of data loss due to clustered storage device failures in the array, or to perform operations for replacing a failed storage device in an array of storage devices having a plurality of sets of storage devices, to reduce the probability of data loss due to clustered storage device failures in the array.

The invention provides a number of advantages. For example, some examples of the invention provide protection from data loss by reducing the probability of data loss due to clustered storage device failures in an array of storage devices. The invention also provides a number of other advantages and benefits, which should be apparent from the following description.

BRIEF DESCRIPTION OF THE DRAWINGS

FIGS. 7A and 7B are a flowchart of an operational sequence for replacing a failed storage device in an array of storage devices having a plurality of sets of storage devices, to reduce the probability of data loss due to clustered storage device failures in the array in accordance with an example of the invention.

DETAILED DESCRIPTION

Figure 1:
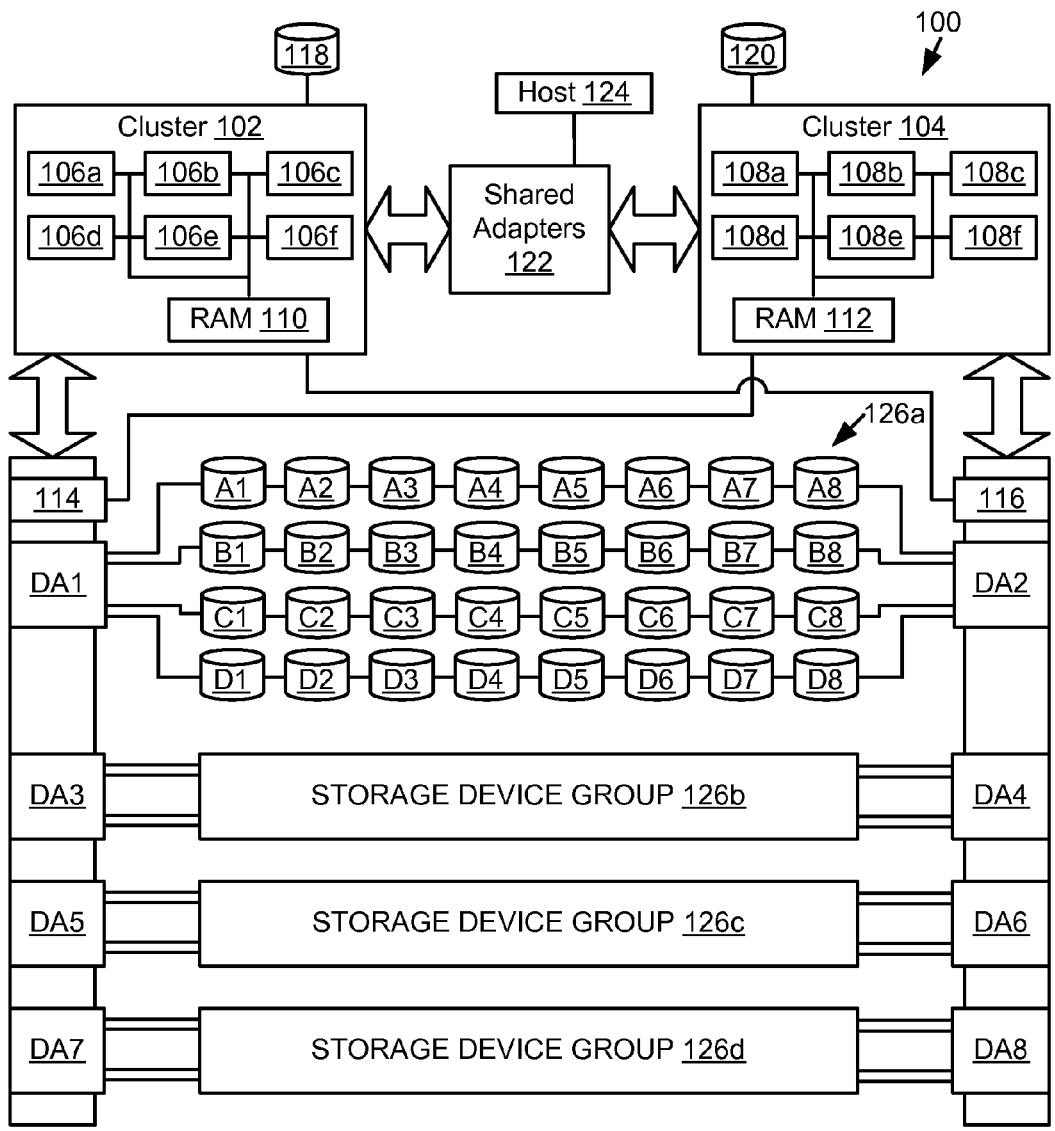
FIG. 1 is a block diagram of the hardware components and interconnections of a computing system in accordance with an example of the invention.

The nature, objectives, and advantages of the invention will become more apparent to those skilled in the art after considering the following detailed description in connection with the accompanying drawings.

I. Hardware Components and Interconnections

One aspect of the invention is a computing system that reduces the probability of data loss due to clustered storage device failures in an array of storage devices. As an example, the computing system may be embodied by all, or portions of, the computing system 100 shown in FIG. 1. In some embodiments, the computing system 100 may include a model 800 Enterprise Storage Server (ESS), manufactured by International Business Machines Corporation.

The computing system 100 includes a first cluster 102, and a second cluster 104. In alternative embodiments, the computing system 100 may have a single cluster or more than two clusters. Each cluster 102, 104 may include software (which may be called configurator software), firmware, and/or microcode, for carrying out one or more examples of the invention or portions of the invention. Each cluster has at least one processor. As an example, each cluster may have four or six processors. In the example shown in FIG. 1, the first cluster 102 has six processors 106a, 106b, 106c, 106d, 106e, and 106f, and the second cluster 104 also has six processors 108a, 108b, 108c, 108d, 108e, and 108f. Any processors having sufficient computing power may be used. As an example, each processor 106a-f, 108a-f, may be a PowerPC RISC processor, manufactured by International Business Machines Corporation. The first cluster 102 also includes a first memory 110, and similarly, the second cluster 104 includes a second memory 112. As an example, the memories 110, 112, may be RAM. The memories 110, 112 may be used to store, for example, data, and application programs and other programming instructions executed by the processors 106a-f, 108a-f. The two clusters 102, 104 may be located in a single enclosure or in separate enclosures. In alternative embodiments, each cluster 102, 104 could be replaced with a supercomputer, a mainframe computer, a computer workstation, and/or a personal computer.

The first cluster 102 is coupled to NVRAM 114 (non-volatile random access memory), which is included with a first group of device adapters DA1, DA3, DA5, DA7 (discussed below). Similarly, the second cluster 104 is coupled to NVRAM 116, which is included with a second group of device adapters DA2, DA4, DA6, DA8 (discussed below). Additionally, the first cluster 102 is coupled to the NVRAM 116, and the second cluster 104 is coupled to the NVRAM 114. As an example, data operated on by cluster 102 is stored in memory 110, and is also stored in NVRAM 116, so that if cluster 102 becomes unoperational, the data will not be lost and can be operated on by cluster 104. Similarly, as an example, data operated on by cluster 104 is stored in memory 112, and is also stored in NVRAM 114, so that if cluster 104 becomes unoperational, the data will not be lost and can be operated on by cluster 102. The NVRAM 114, 116 may, for example, be able to retain data for up to about 48 hours without power.

Within the first cluster 102, two or more of the processors 106a-f may be ganged together to work on the same tasks. However, tasks could be partitioned between the processors 106a-f. Similarly, within the second cluster 104, two or more of the processors 108a-f may be ganged together to work on the same tasks. Alternatively, tasks could be partitioned between the processors 108a-f. With regard to the interaction between the two clusters 102, 104, the clusters 102, 104 may act on tasks independently. However, tasks could be shared by the processors 106a-f, 108a-f in the different clusters 102, 104.

The first cluster 102 is coupled to a first boot device, for example first hard drive 118. Similarly, the second cluster 104 is coupled to a second boot device, for example second hard drive 120.

Each of the clusters 102, 104 is coupled to shared adapters 122, which are shared by the clusters 102, 104. The shared adapters 122 can also be called host adapters. The shared adapters 122 may be, for example, PCI slots, and bays hooked to PCI slots, which may be operated by either cluster 102, 104. As an example, the shared adapters 122 may be SCSI, ESCON, FICON, or Fiber Channel adapters, and may facilitate communications with one or more PCs and/or other hosts, such as host 124. As an example, host 124 may be a zSeries server, or a Netfinity server, available from IBM Corporation.

Additionally, the first cluster 102 is coupled to a first group of device adapters DA1, DA3, DA5, DA7, (which may also be called dedicated adapters), and the second cluster 104 is coupled to a second group of device adapters DA2, DA4, DA6, DA8. Each of the device adapters DA1, DA3, DA5, DA7 is an interface between the first cluster 102 and one of the storage device groups 126a, 126b, 126c, 126d, and similarly, each of the device adapters DA2, DA4, DA6, DA8 is an interface between the second cluster 104 and one of the storage device groups 126a, 126b, 126c, 126d. More specifically, device adapters DA1 and DA2 are coupled to storage device group 126a, device adapters DA3 and DA4 are coupled to storage device group 126b, device adapters DA5 and DA6 are coupled to storage device group 126c, and device adapters DA7 and DA8 are coupled to storage device group 126d. In other embodiments, larger or smaller numbers of device adapters DA1-8, and storage device groups 126a-d could be used. The storage device groups 126a-d are shared by the clusters 102, 104. In alternative embodiments, one or more of the storage device groups could be located at a different site than the first cluster 102 and the second cluster 104.

As an example, each (storage) device adapter DA1-8 may be a Serial Storage Architecture (SSA) adapter. Alternatively, one or more of the device adapters DA1-8 could be implemented with other types of adapters, for example SCSI or Fiber Channel adapters. Each adapter DA 1-8 may include software, firmware, and/or microcode, for carrying out one or more examples of the invention or portions of the invention. As an example, Common Parts Interconnect (CPI) may be used to couple each device adapter DA1-8 to a respective cluster 102, 104.

Each pair of device adapters (DA1 and DA2, DA3 and DA4, DA5 and DA6, DA7 and DA8), is coupled to two loops of storage devices. Each storage device will typically include a storage controller. The storage controller for each storage device may include software, firmware, and/or microcode, for carrying out one or more examples of the invention or portions of the invention. Device adapters DA1 and DA2, for example, are coupled to a first loop of storage devices that includes a first string of storage devices A1, A2, A3, A4, A5, A6, A7, A8, and a second string of storage devices B1, B2, B3, B4, B5, B6, B7, B8. The first and second strings of storage devices in a loop will usually have the same number of storage devices, to keep the loop balanced. Similarly, device adapters DA1 and DA2 are also coupled to a second loop of storage devices that includes a first string of storage devices C1, C2, C3, C4, C5, C6, C7, C8, and a second string of storage devices D1, D2, D3, D4, D5, D6, D7, D8. A collection of eight storage devices such as storage devices A1, A2, A3, A4, A5, A6, A7, and A8 may be referred to as an 8-pack. Although not required, a loop will generally have a minimum of sixteen storage devices. In alternative embodiments, larger or smaller numbers of storage devices could be included in each loop. For example, thirty-two, forty-eight, or other numbers of storage devices could be included in each loop. Usually, the strings of storage devices in a loop have equal numbers of storage devices. Each loop of storage devices forms a serial loop with each device adapter that the loop of storage devices is coupled to. For example, the loop of storage devices that includes storage devices A1, A2, A3, A4, A5, A6, A7, A8, and B1, B2, B3, B4, B5, B6, B7, B8 forms a serial loop with device adapter DA1, and also forms a serial loop with device adapter DA2. This arrangement increases reliability because each serial loop provides redundant communication paths between each storage device in the loop and each device adapter coupled to the loop.

The storage devices within each group of storage devices 126a, 126b, 126c, 126d may be grouped into one or more storage device arrays, each of which may be, for example, a Redundant Array of Inexpensive (or Independent) Disks (RAID). RAID arrays may also be called RAID ranks. Responsive to read and write requests received from the first and second clusters 102, 104, (or from host 124), the (storage) device adapters DA1-8 are able to individually address each storage device in the RAID arrays to which they are coupled. The storage devices in a particular RAID array may be in the same loop, or in different loops, between a pair of device adapters. As an example where RAID arrays are made from storage devices that are in a single loop, a first RAID array may include storage devices A1, A2, A3, A4, B 1, B2, and B3, and a second RAID array may include storage devices A6, A7, A8, B5, B6, B7, and B8, with storage devices B4 and A5 designated as spares that can be used by either RAID array. In this example, each RAID array includes storage devices from the A1, A2, A3, A4, A5, A6, A7, A8, 8-pack, and from the B1, B2, B3, B4, B5, B6, B7, B8, 8-pack, so that each RAID array is close to one of the device adapters DA1, DA2. As an example where RAID arrays are made from storage devices that are in different loops, a first RAID array may include storage devices A1, A2, B1, B2, C1, C2, and D1, a second RAID array may include storage devices A3, A4, B3, B4, C3, D3, and D4, a third RAID array may include storage devices A5, A6, B6, C5, C6, D5, and D6, and a fourth RAID array may include storage devices A8, B7, B8, C7, C8, D7, and D8, with storage devices D2, C4, B5, and A7 designated as spares that can be used by any of the four RAID arrays. In these examples, RAID arrays and spare storage devices that are available for the RAID arrays, are coupled to the same pair of device adapters. However, a RAID array, and spare storage devices that are available for the RAID array, could be coupled to different pairs of device adapters. Also, a RAID array and spare storage devices that are available for the RAID array may be in a single loop, or in different loops.

Data, and if desired, parity information, may be stored on the storage devices of a RAID array in any desired arrangement, which may include striping and/or mirroring across all, or some, of the storage devices in a RAID array. As an example, six storage devices in a RAID array may be used to store data, and a seventh storage device in the RAID array may be used to store parity information. In another example, seven storage devices in a RAID array may be used to store data, and an eighth storage device in the RAID array may be used to store parity information. As another example, both data and parity information may be stored on all of the storage devices in a RAID array. In other embodiments RAID arrays could have less than seven, or more than eight storage devices. For example, a RAID array could consist of five or six storage devices that are each used to store both data and parity information. Also, double parity information may be stored to permit recovery from a second storage device failure that occurs before completing a rebuild after a first storage device failure. For example, a RAID array could consist of six storage devices that are used to store data, and two storage devices that are used to store parity information. As another example, seven storage devices could be used for data, another seven storage devices could be used to mirror the data on the first seven storage devices, and two more storage devices could be used to store parity information, which all together could provide for recovery from the failure of nine storage devices (a failure tolerance of nine). In some examples, the RAID array may include a primary set of storage devices, and a first mirror copy of the primary set of storage devices, and could also include second or more mirror copies of the primary set of storage devices.

The storage devices in the storage device groups 126a-d generally may be any suitable devices for storing data, and may use magnetic, optical, magneto-optical, electrical, or any other suitable technology for storing data. For example, the storage devices could be hard disk drives, optical disks or discs (for example, CD-R, CD-RW, WORM, DVD-R, DVD+R, DVD-RW, or DVD+RW), floppy disks, magnetic data storage disks or diskettes, magnetic tape, digital optical tape, EPROMs, EEPROMs, or flash memory. The storage devices do not each have to be the same type of device or use the same type of technology. As an example, each storage device may be a hard drive, having a capacity, for example, of 146 Giga Bytes. In one example, each storage device group 126a-d may be a storage enclosure in a model 2105 Enterprise Storage Server, manufactured by International Business Machines Corporation.

The first cluster 102 and/or the second cluster 104 together with at least one device adapter DA1-8 and at least a portion of at least one storage device group 126a-d may be referred to as a computing system. One or more device adapters DA1-8, with or without a portion of at least one storage device group 126a-d, may also be referred to as a computing system. A storage device controller may also be called a computing system.

Figure 2:
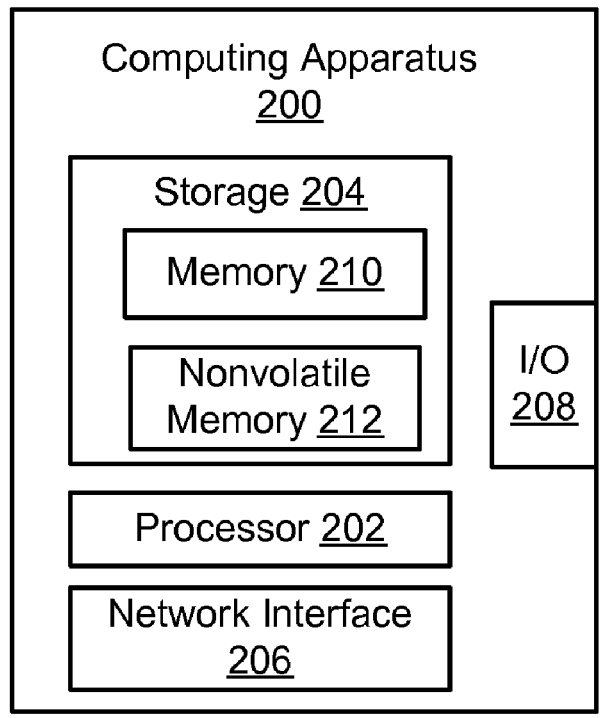
FIG. 2 is a block diagram of the hardware components and interconnections of a computing apparatus in accordance with an example of the invention.

An exemplary computing apparatus 200 is shown in FIG. 2. As an example, host 124, (and in alternative embodiments) cluster 102 and/or cluster 104, could be implemented with an embodiment of the computing apparatus 200. The computing apparatus 200 includes a processor 202 (which may be called a processing device), and in some examples could have more than one processor 202. As an example, the processor may be a PowerPC RISC processor, available from International Business Machines Corporation, or a processor manufactured by Intel Corporation. The processor 202 may run any suitable operating system, for example, Windows 2000, AIX, Solaris™, Linux, UNIX, or HP-UX™. The computing apparatus 200 may be implemented on any suitable computer, for example a personal computer, a workstation, a mainframe computer, or a supercomputer. The computing apparatus 200 also includes a storage 204, a network interface 206, and an input/output 208, which are all coupled to the processor 202. The storage 204 may include a primary memory 210, which for example, may be RAM, and a non volatile memory 212. The non-volatile memory 212 could be, for example, a hard disk drive, a drive for reading and writing from optical or magneto-optical media, a tape drive, non-volatile RAM (NVRAM), or any other suitable type of storage. The storage 204 may be used to store data and application programs and/or other programming instructions executed by the processor. The network interface 206 may provide access to any suitable wired or wireless network or communications link.

II. Operation

In addition to the hardware embodiments described above, other aspects of the invention concern operations for configuring an array of storage devices to reduce the probability of data loss due to clustered storage device failures in the array, or operations for replacing a failed storage device in an array of storage devices having a plurality of sets of storage devices, to reduce the probability of data loss due to clustered storage device failures in the array.

A. Signal-Bearing Media

In the context of FIGS. 1 and 2, the method aspects of the invention may be implemented, for example, by having one or more of the device adapters DA1-8, one or more storage device controllers (for example disk drive controllers), cluster 102, and/or cluster 104 (and/or host 124), execute a sequence of machine-readable instructions, which can also be referred to as code, for carrying out one or more examples of the invention or portions of the invention. These instructions may reside in various types of signal-bearing media. In this respect, some aspects of the present invention concern a programmed product, comprising a signal-bearing medium or signal-bearing media tangibly embodying a program of machine-readable instructions executable by a digital processing apparatus to perform operations for configuring an array of storage devices to reduce the probability of data loss due to clustered storage device failures in the array, or for replacing a failed storage device in an array of storage devices having a plurality of sets of storage devices, to reduce the probability of data loss due to clustered storage device failures in the array.

Figure 3:
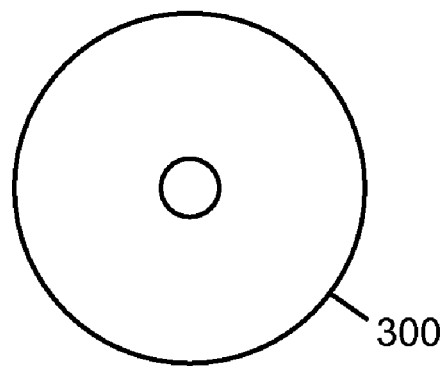
FIG. 3 is an example of a signal-bearing medium in accordance with an example of the invention.

This signal-bearing medium may comprise, for example, RAM 110, RAM 112, NVRAM 114, NVRAM 116, primary memory 210, non-volatile memory 212, and/or firmware in device adapters DA1-8 and/or storage device controllers. Alternatively, the instructions may be embodied in a signal-bearing medium such as the optical data storage disc 300 shown in FIG. 3. The optical disc can be any type of signal bearing disc or disk, for example, a CD-ROM, CD-R, CD-RW, WORM, DVD-R, DVD+R, DVD-RW, or DVD+RW. Additionally, whether contained in the computing system 100, or elsewhere, the instructions may be stored on any of a variety of machine-readable data storage mediums or media, which may include, for example, a "hard disk drive", a RAID array, a magnetic data storage diskette (such as a floppy disk), magnetic tape, digital optical tape, RAM, ROM, EPROM, EEPROM, flash memory, programmable logic, any other type of firmware, magneto-optical storage, paper punch cards, or any other suitable signal-bearing media including transmission media such as digital and/or analog communications links, which may be electrical, optical, and/or wireless. For example, in some embodiments the instructions or code may be accessible from a file server over a network, or from other transmission media, and the signal bearing media embodying the instructions or code may comprise a transmission media, such as a network transmission line, wireless transmission media, signals propagating through space, radio waves, and/or infrared signals. Alternatively, the signal bearing media may be implemented in hardware logic, for example, an integrated circuit chip, a Programmable Gate Array (PGA), or an Application Specific Integrated Circuit (ASIC). As an example, the machine-readable instructions may comprise microcode, or may comprise software object code, compiled from a language such as "C++".

B. Overall Sequence of Operation

For ease of explanation, but without any intended limitation, exemplary method aspects of the invention are described with reference to the computing system 100 described above and shown in FIG. 1. As an example, operations of the method aspects of the invention (or portions of the method aspects), may be performed by one or more of the device adapters DA1-8, storage device controllers, cluster 102, and/or cluster 104 (and/or host 104). In the exemplary method aspects of the invention described herein, the storage devices may be members of a RAID array, or another type of storage device array. As an example, the storage device array may include some, or all, of the storage devices in one or more of the storage device groups 126a-d. As mentioned above, in some examples the storage devices may be hard disk drives.

1. First Example

Figure 4A:
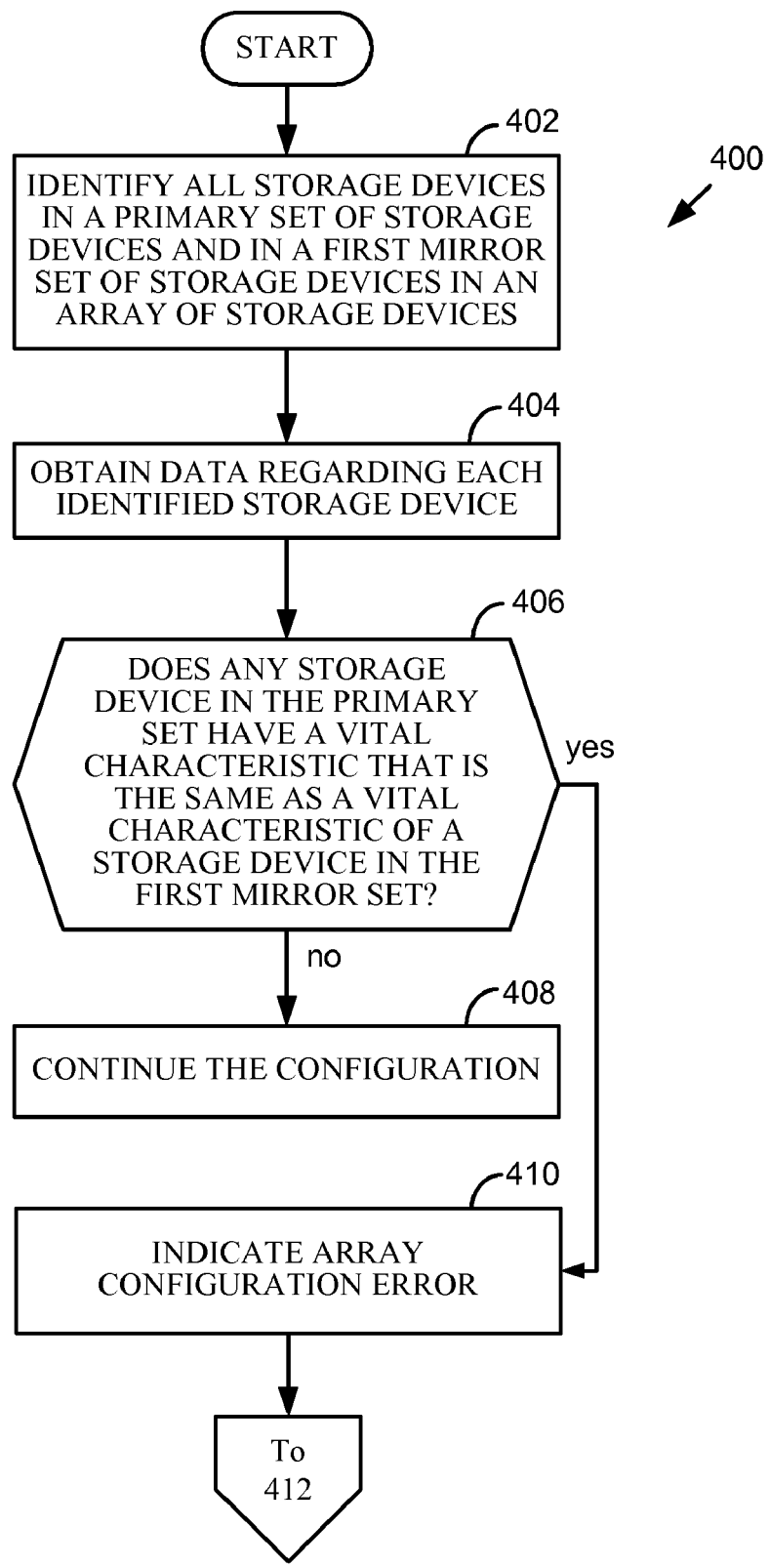
FIGS. 4A and 4B are a flowchart of an operational sequence for configuring an array of storage devices to reduce the probability of data loss due to clustered storage device failures in the array in accordance with an example of the invention.
Figure 4B:
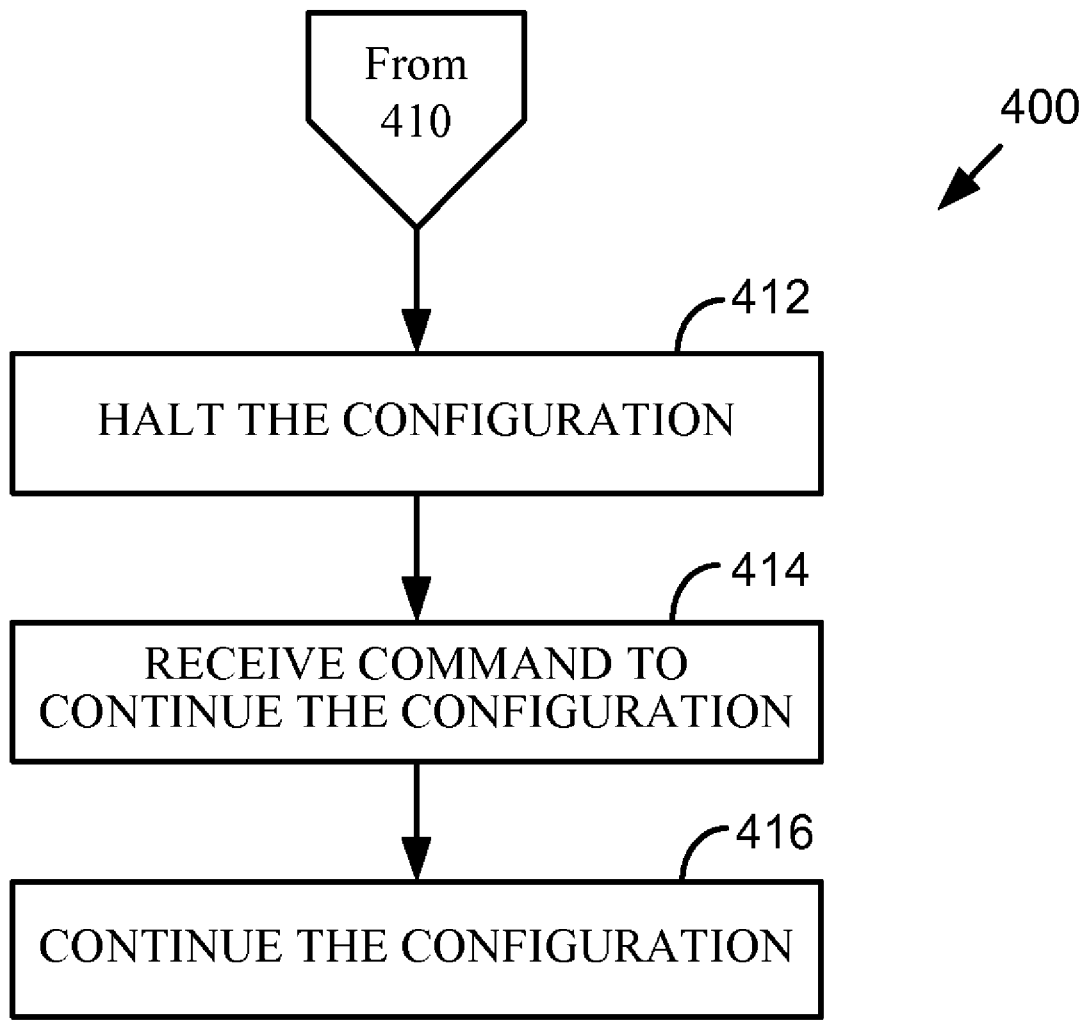

An example of the method aspect of the invention is illustrated in FIGS. 4A and 4B, which show a sequence 400 for a method for configuring an array of storage devices to reduce the probability of data loss due to clustered storage device failures in the array. Referring to FIG. 4A, sequence 400 may include, and may begin with, operation 402, which comprises identifying all storage devices in a primary set of storage devices and a first mirror set of storage devices in the array of storage devices. Sequence 400 may also include operation 404, which comprises obtaining data regarding each identified storage device. As an example, the data obtained regarding each of the storage devices identified in the array may include vital product data. In some examples, the data obtained regarding each of the storage devices identified in the array may be obtained from the respective storage device.

Sequence 400 may also include operation 406, which comprises determining if any of the storage devices in the primary set of storage devices has a vital characteristic (which means has a value of the vital characteristic) that is the same as a (value of a) vital characteristic of any of the storage devices in the first mirror set of storage devices, and if not, the sequence 400 may include operation 408, which comprises continuing the configuration. As an example, the vital characteristic may be a manufacturer identifier. As another example, the vital characteristic may be a product identifier (which may be a product number, that may include alphanumeric characters and any other types of characters). In other examples, the vital characteristic may be power on hours, power cycles (which means the number of power cycles), or manufacturing date. Other vital characteristics could be used. If it is determined that any of the storage devices in the primary set of storage devices has a (value of a) vital characteristic that is the same as a (value of a) vital characteristic of any of the storage devices in the first mirror set of storage devices, then the sequence 400 may include operation 410, which comprises indicating an array configuration error. Referring to FIG. 4B, the sequence 400 may also include operation 412, which comprises halting the configuration of the array if an array configuration error is indicated. The sequence 400 may also include operation 414, which comprises receiving a command to continue the configuration, and may also include operation 416, which comprises continuing the configuration.

In some alternative examples, the operation of determining if any of the storage devices in the primary set of storage devices has a vital characteristic that is the same as a vital characteristic of any of the storage devices in the first mirror set of storage devices, may be repeated for a plurality of vital characteristics. Further, in these alternative examples, an array configuration error may be indicated in cases where the plurality of vital characteristics of any of the storage devices in the primary set of storage devices are the same as the plurality of vital characteristics of any of the storage devices in the first mirror set of storage devices.

In some alternative examples, the operations may further comprise identifying all storage devices in a second mirror set of storage devices in the array of storage devices. In this alternative example, the operations may further comprise, obtaining data regarding the storage device, for each storage device identified in the second mirror set of storage devices. The operations in this alternative example may further comprise determining if any of the storage devices in the second mirror set of storage devices has a vital characteristic that is the same as a vital characteristic of any of the storage devices in a combined set of storage devices that includes the primary set of storage devices and the first mirror set of storage devices, and if so, indicating an improper configuration error, and if not, continuing the configuration process.

2. Second Example

Figure 5A:
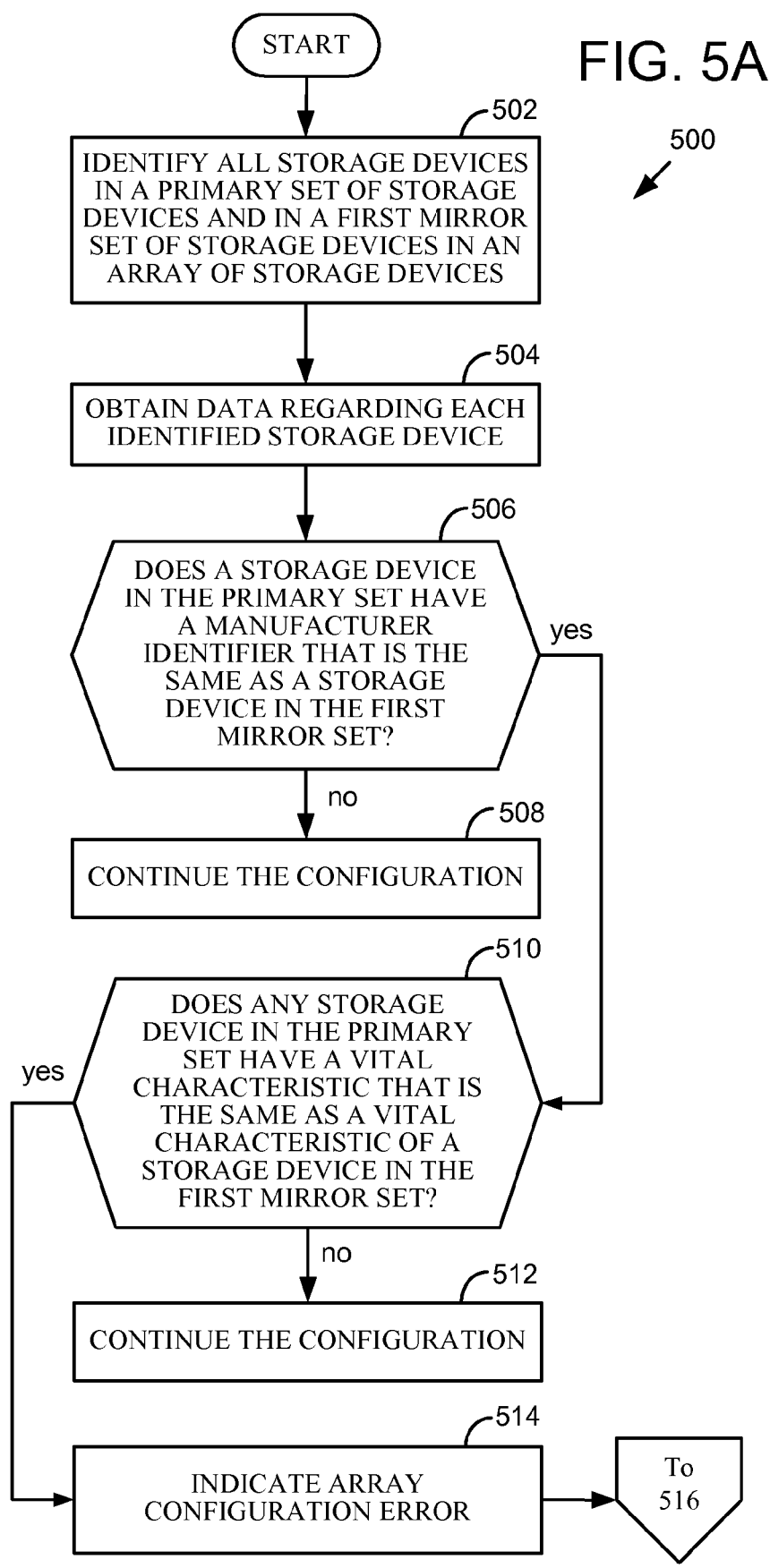
FIGS. 5A and 5B are a flowchart of an operational sequence for configuring an array of storage devices to reduce the probability of data loss due to clustered storage device failures in the array in accordance with an example of the invention.
Figure 5B:
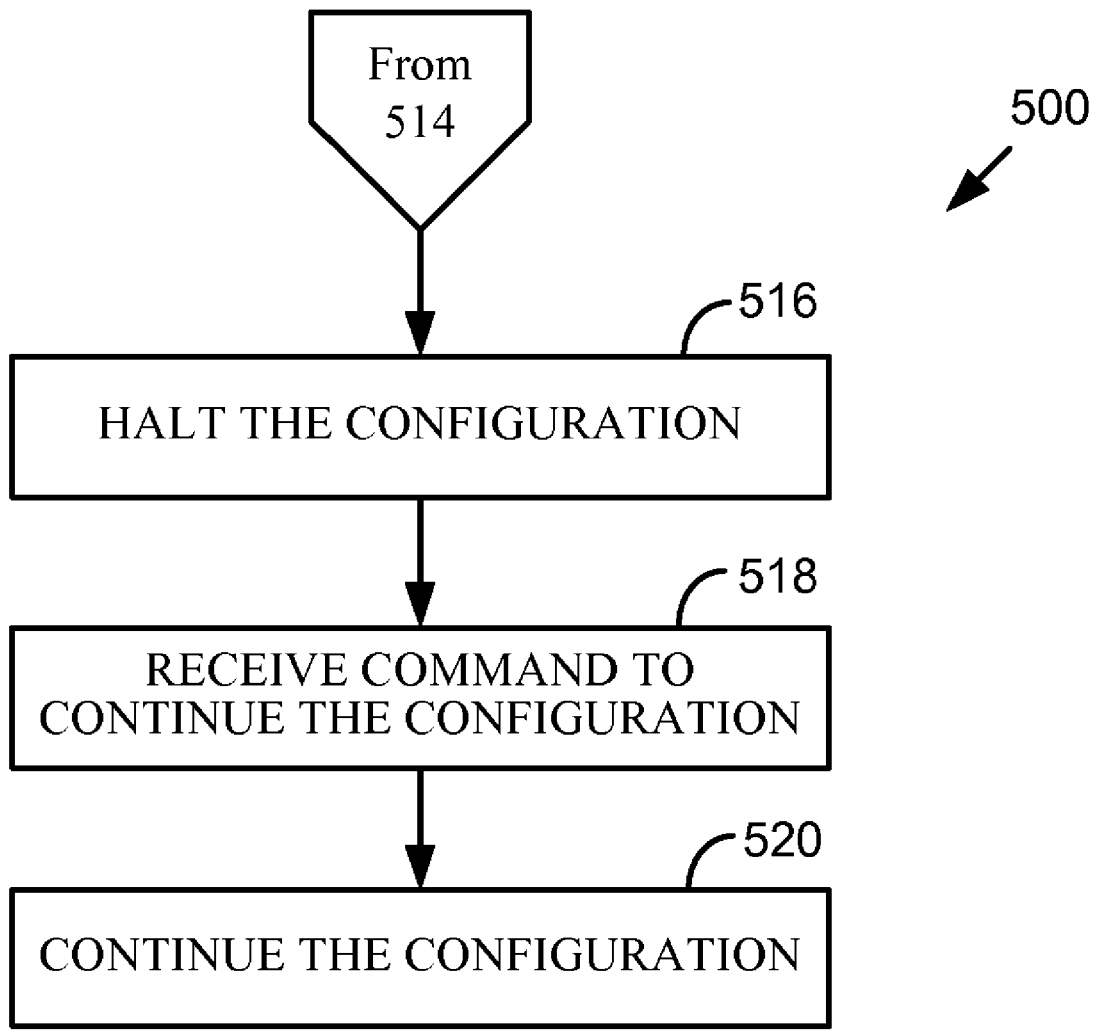

Another example of the method aspect of the invention is illustrated in FIGS. 5A and 5B, which show a sequence 500 for a method for configuring an array of storage devices to reduce the probability of data loss due to clustered storage device failures in the array. Referring to FIG. 5A, sequence 500 may include, and may begin with, operation 502, which comprises identifying all storage devices in a primary set of storage devices and a first mirror set of storage devices in the array of storage devices. Sequence 500 may also include operation 504, which comprises obtaining data regarding each identified storage device. As an example, the data obtained regarding each of the storage devices identified in the array may include vital product data.

Sequence 500 may also include operation 506, which comprises determining if at least one of the storage devices in the primary set of storage devices has a manufacturer identifier that is the same as the manufacturer identifier of at least one of the storage devices in the first mirror set of storage devices, and if not, the sequence 500 may also include operation 508, which comprises continuing the configuration. In alternative embodiments, product identifier, rather than manufacturer identifier, may be used in sequence 500. If it is determined that at least one of the storage devices in the primary set of storage devices has a manufacturer identifier that is the same as the manufacturer identifier of at least one of the storage devices in the first mirror set of storage devices, then the sequence 500 may include operation 510, which comprises, for storage devices determined to have the same manufacturer identifier, determining if any of the storage devices in the primary set of storage devices has a (value of a) vital characteristic that is the same as a (value of a) vital characteristic of any of the storage devices in the first mirror set of storage devices. If not, the sequence 500 may include operation 512, which comprises continuing the configuration. As an example, the vital characteristic may be a manufacturer identifier. As another example, the vital characteristic may be a product identifier (which may be a product number, that may include alphanumeric characters and any other types of characters). In other examples, the vital characteristic may be power on hours, power cycles, or manufacturing date. In some examples, power on hours may be considered to be the same if the power on hours do not have a difference of at least a specified number of hours. In some examples, power cycles may be considered to be the same if the power cycles do not have a difference of at least a specified number of power cycles. In some examples, two manufacturing dates may be considered to be the same if the two manufacturing dates do not differ by more than a specified number of days. If it is determined, for storage devices determined to have the same manufacturer identifier, that any of the storage devices in the primary set of storage devices has a vital characteristic that is the same as a vital characteristic of any of the storage devices in the first mirror set of storage devices, then the sequence 500 may include operation 514, which comprises indicating an array configuration error. Referring to FIG. 5B, the sequence 500 may also include operation 516, which comprises halting the configuration of the array if an array configuration error is indicated. The sequence 500 may also include operation 518, which comprises receiving a command to continue the configuration, and may also include operation 520, which comprises continuing the configuration.

3. Third Example

Figure 6A:
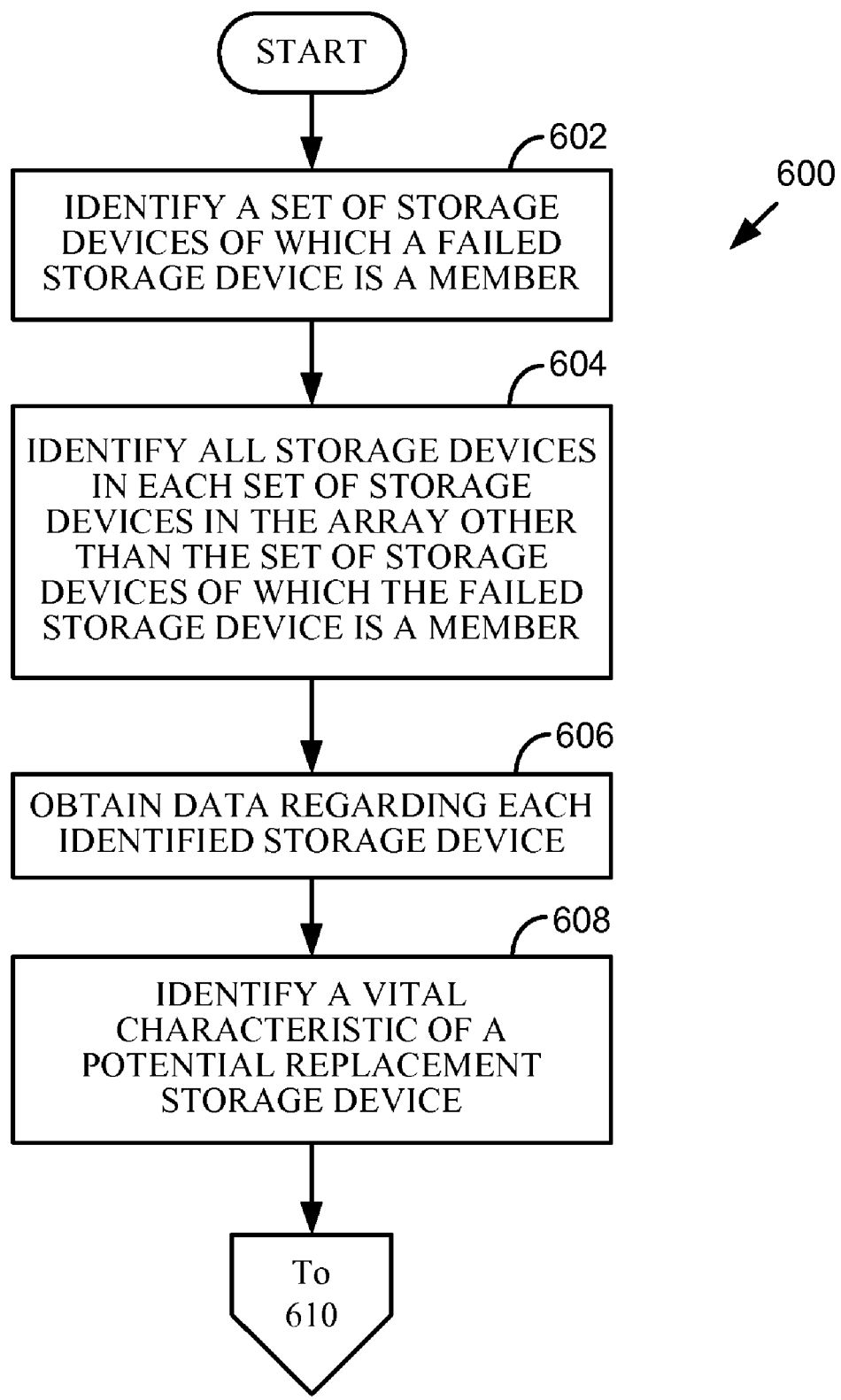
FIGS. 6A and 6B are a flowchart of an operational sequence for replacing a failed storage device in an array of storage devices having a plurality of sets of storage devices, to reduce the probability of data loss due to clustered storage device failures in the array in accordance with an example of the invention.
Figure 6B:
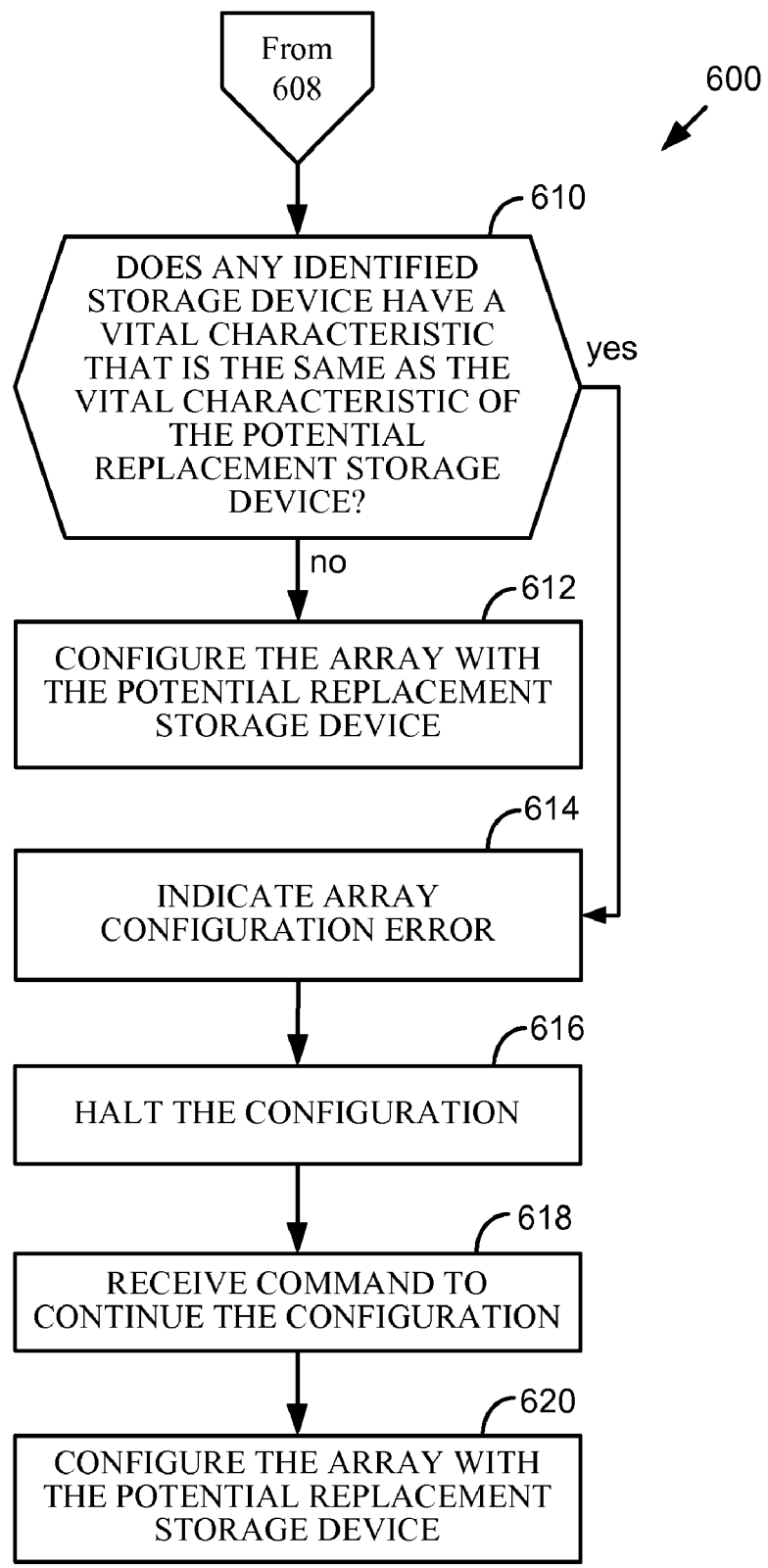

Another example of the method aspect of the invention is illustrated in FIGS. 6A and 6B, which show a sequence 600 for a method for replacing a failed storage device in an array of storage devices having a plurality of sets of storage devices, to reduce the probability of data loss due to clustered storage device failures in the array. Referring to FIG. 6A, sequence 600 may include, and may begin with, operation 602, which comprises identifying a set of storage devices of which the failed storage device is a member. Sequence 600 may also include operation 604, which comprises identifying all storage devices in each set of storage devices in the array other than the set of storage devices of which the failed storage device is a member. Sequence 600 may also include operation 606, which comprises obtaining data regarding each identified storage device. Sequence 600 may also include operation 608, which comprises identifying a (value of a) vital characteristic of a potential replacement storage device. As an example, the vital characteristic may be a manufacturer identifier. As another example, the vital characteristic may be a product identifier (which may be a product number, that may include alphanumeric characters and any other types of characters). In other examples, the vital characteristic may be power on hours, power cycles, or manufacturing date.

Referring to FIG. 6B, sequence 600 may also include operation 610, which comprises determining if any identified storage device has a (value of a) vital characteristic that is the same as the (value of a) vital characteristic of the potential replacement storage device, and if not the sequence may include operation 612, which comprises configuring the array with the potential replacement storage device. If so, the sequence 600 may include operation 614, which comprises indicating an array configuration error. Sequence 600 may also include operation 616, which comprises halting the configuration. Sequence 600 may also include operation 618, which comprises receiving a command to continue the configuration, and operation 620, which comprises configuring the array with the potential replacement storage device.

4. Fourth Example

Figure 7B:
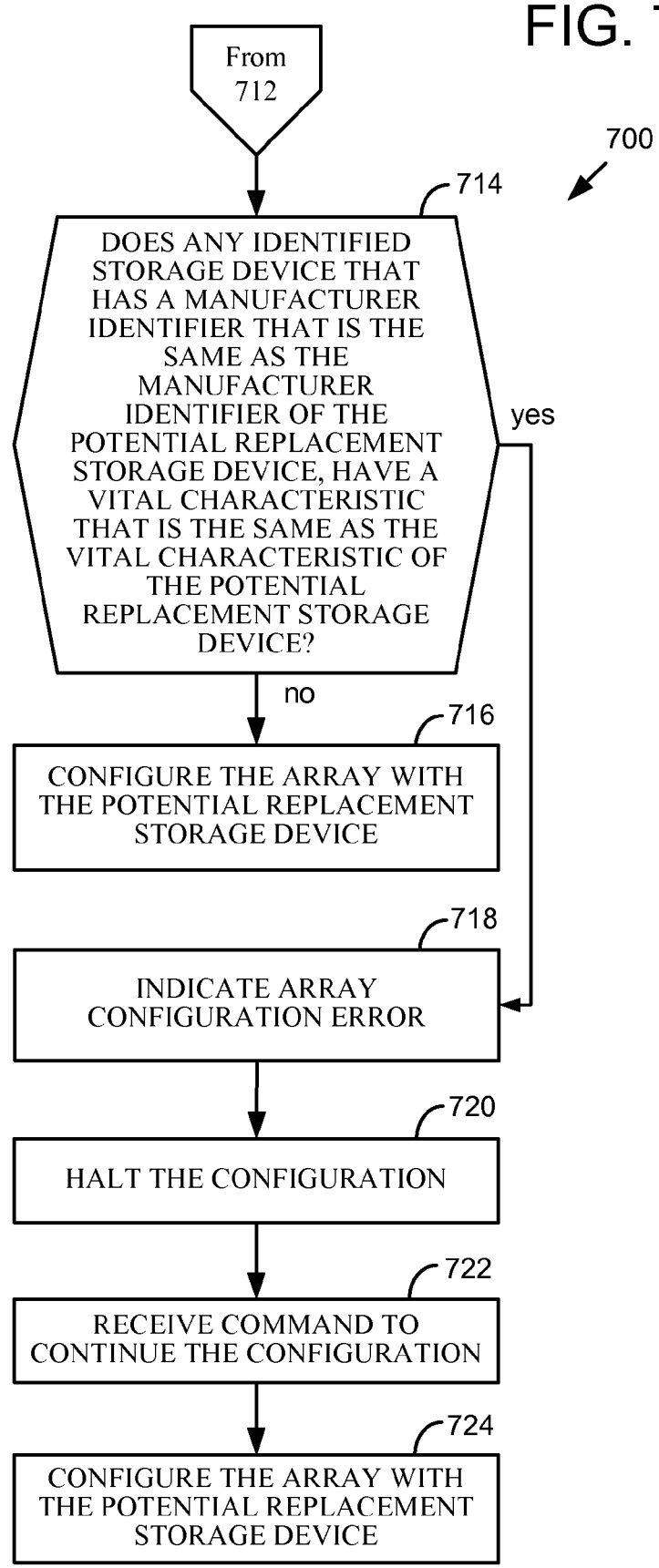

Another example of the method aspect of the invention is illustrated in FIGS. 7A and 7B, which show a sequence 700 for a method for replacing a failed storage device in an array of storage devices having a plurality of sets of storage devices, to reduce the probability of data loss due to clustered storage device failures in the array. Referring to FIG. 7A, sequence 700 may include, and may begin with, operation 702, which comprises identifying a set of storage devices of which the failed storage device is a member. Sequence 700 may also include operation 704, which comprises identifying all storage devices in each set of storage devices in the array other than the set of storage devices of which the failed storage device is a member. Sequence 700 may also include operation 706, which comprises obtaining data regarding each identified storage device.

Sequence 700 may also include operation 708, which comprises determining if at least one of the identified storage devices has a manufacturer identifier that is the same as a manufacturer identifier of the potential replacement storage device. If not, the sequence 700 may also include operation 710, which comprises configuring the array with the potential replacement storage device. If so, sequence 700 may also include operation 712, which comprises identifying a vital characteristic of a potential replacement storage device. In alternative embodiments, product identifier, rather than manufacturer identifier, may be used in sequence 700.

Referring to FIG. 7B, sequence 700 may also include in operation 714, which comprises, for each storage device that has a manufacturer identifier that is the same as the manufacturer identifier of the potential replacement storage device, determining if any identified storage device has a (value of a) vital characteristic that is the same as the (value of a) vital characteristic of the potential replacement storage device. If not, the sequence may include operation 716, which comprises configuring the array with the potential replacement storage device. If so, the sequence 700 may include operation 718, which comprises indicating a array configuration error. As an example, the vital characteristic may be a manufacturer identifier. As another example, the vital characteristic may be a product identifier (which may be a product number, that may include alphanumeric characters and any other types of characters). In other examples, the vital characteristic may be power on hours, power cycles, or manufacturing date. In some examples, power on hours may be considered to be the same if the power on hours do not have a difference of at least a specified number of hours. In some examples, power cycles may be considered to be the same if the power cycles do not have a difference of at least a specified number of power cycles. In some examples, two manufacturing dates may be considered to be the same if the two manufacturing dates do not differ by more than a specified number of days. Sequence 700 may also include operation 720, which comprises halting the configuration. Sequence 700 may also include operation 722, which comprises receiving a command to continue the configuration, and operation 724, which comprises configuring the array with the potential replacement storage device.

C. Additional Discussion

Some examples of the invention may be called dual sourcing hard disk drives for ultra reliable RAID subsystems. Also, some examples of the invention may be called multiple sourcing storage devices for ultra reliable mirrored storage subsystems. However, the invention is not limited to obtaining storage devices from multiple sources, and some examples of the invention include obtaining and utilizing storage devices having different (values of) vital characteristics from the same, or different, sources. Some examples of the invention may be implemented with configurator software for RAID arrays, which installs and configures drives. Generally, to implement examples of the invention, a RAID subsystem and its configuration tools including RAS (Reliability, Availability, and Service code) may be configured to provide a preference for establishing a separate RAID mirror and spare complement, using disk drives obtained from a different manufacturer than the primary array. Examples of the invention may be implemented using an identifier such as VPD (Vital Product Data) information, which may include items such as drive part numbers, DDM (Hard Disk Drive Mode), firmware, etc., which may all be classes of vital characteristics. In accordance with some examples of the invention, when servicing an array, failed drives are replaced only with drives from the same array as the failed drive, to ensure no crossover between suppliers.

Some examples of the invention comprise using two or more separate and alternate sources of hard disk drives in RAID mirroring configurations to substantially eliminate (customer) data loss due to clustering of failures of disk arrays in a RAID configuration. This technique is useful for reducing data loss, because the probability that two different drive designs will have the same cluster failure parameters, including the characteristic time to gestation of the clustering, and the trigger mechanism, is extremely low. By ensuring that the mirrored drives come from an alternate supplier of drives, the potential for data loss due to clustered failures is essentially eliminated. A specific example of the invention comprises a RAID susbsystem that utilizes mirroring schemes such as RAID 51, Sym (3+3), wherein the data drives, the parity drives, and the spares of the mirror are from a different supplier than the primary drives. An even more robust system could be realized if higher mirroring is used with a third hard disk supplier.

III. Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method for configuring an array of storage devices to reduce the probability of data loss due to clustered storage device failures in the array, the method comprising the following operations:
    identifying all storage devices in a primary set of storage devices and a first mirror set of storage devices in the array of storage devices;
    obtaining data regarding each identified storage device;
    determining if any of the storage devices in the primary set of storage devices has a vital characteristic that is the same as a vital characteristic of any of the storage devices in the first mirror set of storage devices;
    and if so, indicating an array configuration error, and halting the configuration of the array if an array configuration error is indicated;
    and if not, continuing the configuration.

2. The method of claim 1, wherein the operations further comprise, after indicating an array configuration error:
    receiving a command to continue the configuration; and
    continuing the configuration.

3. The method of claim 1, wherein the vital characteristic is a manufacturer identifier.

4. The method of claim 1, wherein the vital characteristic is a product identifier.

5. The method of claim 1, wherein the vital characteristic is power on hours, and wherein the operations further comprise:
    determining if at least one of the storage devices in the primary set of storage devices has a manufacturer identifier that is the same as the manufacturer identifier of at least one of the storage devices in the first mirror set of storage devices;
    and wherein the operation of determining if any of the storage devices in the primary set of storage devices has the vital characteristic that is the same as the vital characteristic of any of the storage devices in the first mirror set of storage devices, is conducted only for storage devices determined to have the same manufacturer identifier;
    and wherein power on hours are the same if the power on hours do not have a difference of at least a specified number of hours.

6. The method of claim 1, wherein the vital characteristic is power on hours, and wherein the operations further comprise:
    determining if at least one of the storage devices in the primary set of storage devices has a storage device product identifier that is the same as the storage device product identifier of at least one of the storage devices in the first mirror set of storage devices;
    and wherein the operation of determining if any of the storage devices in the primary set of storage devices has the vital characteristic that is the same as the vital characteristic of any of the storage devices in the first mirror set of storage devices, is conducted only for storage devices determined to have the same product identifier;
    and wherein power on hours are the same if the power on hours do not have a difference of at least a specified number of hours.

7. The method of claim 1, wherein the vital characteristic is power cycles, and wherein the operations further comprise:
    determining if at least one of the storage devices in the primary set of storage devices has a manufacturer identifier that is the same as the manufacturer identifier of at least one of the storage devices in the first mirror set of storage devices;
    and wherein the operation of determining if any of the storage devices in the primary set of storage devices has the vital characteristic that is the same as the vital characteristic of any of the storage devices in the first mirror set of storage devices, is conducted only for storage devices determined to have the same manufacturer identifier;
    and wherein power cycles are the same if the power cycles do not have a difference of at least a specified number of power cycles.

8. The method of claim 1, wherein the vital characteristic is power cycles, and wherein the operations further comprise:
    determining if at least one of the storage devices in the primary set of storage devices has a storage device product identifier that is the same as the storage device product identifier of at least one of the storage devices in the first mirror set of storage devices;
    and wherein the operation of determining if any of the storage devices in the primary set of storage devices has the vital characteristic that is the same as the vital characteristic of any of the storage devices in the first mirror set of storage devices, is conducted only for storage devices determined to have the same product identifier;
    and wherein power cycles are the same if the power cycles do not have a difference of at least a specified number of power cycles.

9. The method of claim 1, wherein the vital characteristic is manufacturing date, and wherein the operations further comprise:
    determining if at least one of the storage devices in the primary set of storage devices has a manufacturer identifier that is the same as the manufacturer identifier of at least one of the storage devices in the first mirror set of storage devices;
    and wherein the operation of determining if any of the storage devices in the primary set of storage devices has the vital characteristic that is the same as the vital characteristic of any of the storage devices in the first mirror set of storage devices, is conducted only for storage devices determined to have the same manufacturer identifier;

and wherein two manufacturing dates are the same if the two manufacturing dates do not differ by more than a specified number of days.

10. The method of claim 1, wherein the vital characteristic is manufacturing date, and wherein the operations further comprise:

determining if at least one of the storage devices in the primary set of storage devices has a storage device product identifier that is the same as the storage device product identifier of at least one of the storage devices in the first mirror set of storage devices;

and wherein the operation of determining if any of the storage devices in the primary set of storage devices has the vital characteristic that is the same as the vital characteristic of any of the storage devices in the first mirror set of storage devices, is conducted only for storage devices determined to have the same product identifier;

and wherein two manufacturing dates are the same if the two manufacturing dates do not differ by more than a specified number of days.

11. A method for configuring an array of storage devices to reduce the probability of data loss due to clustered storage device failures in the array, the method comprising the following operations:

identifying all storage devices in a primary set of storage devices and a first mirror set of storage devices in the array of storage devices;

obtaining data regarding each identified storage device;

determining if any of the storage devices in the primary set of storage devices has a vital characteristic that is the same as a vital characteristic of any of the storage devices in the first mirror set of storage devices;

and if so, indicating an array configuration error, and halting the configuration of the array if an array configuration error is indicated;

and if not, continuing the configuration;

wherein the operation of determining if any of the storage devices in the primary set of storage devices has a vital characteristic that is the same as a vital characteristic of any of the storage devices in the first mirror set of storage devices, is repeated for a plurality of vital characteristics;

and wherein an array configuration error is indicated only if the plurality of vital characteristics of any of the storage devices in the primary set of storage devices are the same as the plurality of vital characteristics of any of the storage devices in the first mirror set of storage devices.

12. The method of claim 11, wherein the data obtained regarding each of the storage devices identified in the array includes vital product data.

13. The method of claim 11, wherein the data obtained regarding each of the storage devices identified in the array is obtained from the respective storage device.

14. The method of claim 11, wherein the operations further comprise identifying all storage devices in a second mirror set of storage devices in the array of storage devices;

for each storage device identified in the second mirror set of storage devices, obtaining data regarding the storage device;

determining if any of the storage devices in the second mirror set of storage devices has a vital characteristic that is the same as a vital characteristic of any of the storage devices in a combined set of storage devices that includes the primary set of storage devices and the first mirror set of storage devices;

and if so, indicating an improper configuration error;

and if not, continuing the configuration process.

15. A method for replacing a failed storage device in an array of storage devices having a plurality of sets of storage devices, to reduce the probability of data loss due to clustered storage device failures in the array, the method comprising the following operations:

identifying a set of storage devices of which the failed storage device is a member;

identifying all storage devices in each set of storage devices in the array other than the set of storage devices of which the failed storage device is a member;

obtaining data regarding each identified storage device, wherein the data obtained regarding each identified storage device includes vital product data;

identifying a vital characteristic of a potential replacement storage device;

determining if any identified storage device has a vital characteristic that is the same as the vital characteristic of the potential replacement storage device;

and if so, indicating a array configuration error;

and if not, configuring the array with the potential replacement storage device.

16. The method of claim 15, wherein the vital characteristic is a manufacturer identifier.

17. The method of claim 15, wherein the vital characteristic is a product identifier.

18. The method of claim 15, wherein the vital characteristic is power on hours, and wherein the operations further comprise:

determining if at least one of the identified storage devices has a manufacturer identifier that is the same as a manufacturer identifier of the potential replacement storage device;

and wherein the operation of determining if any identified storage device has a vital characteristic that is the same as the vital characteristic of the potential replacement storage device, is conducted only for each storage device that has a manufacturer identifier that is the same as the manufacturer identifier of the potential replacement storage device;

and wherein power on hours are the same if the power on hours do not have a difference of at least a specified number of hours.

19. The method of claim 15, wherein the vital characteristic is power cycles, and wherein the operations further comprise:

determining if at least one of the identified storage devices has a manufacturer identifier that is the same as a manufacturer identifier of the potential replacement storage device;

and wherein the operation of determining if any identified storage device has a vital characteristic that is the same as the vital characteristic of the potential replacement storage device, is conducted only for each storage device that has a manufacturer identifier that is the same as the manufacturer identifier of the potential replacement storage device;

and wherein power cycles are the same if the power cycles do not have a difference of at least a specified number of power cycles.

20. The method of claim 15, wherein the vital characteristic is manufacturing date, and wherein the operations further comprise:

determining if at least one of the identified storage devices has a manufacturer identifier that is the same as a manufacturer identifier of the potential replacement storage device;

and wherein the operation of determining if any identified storage device has a vital characteristic that is the same as the vital characteristic of the potential replacement storage device, is conducted only for each storage device that has a manufacturer identifier that is the same as the manufacturer identifier of the potential replacement storage device;

and wherein two manufacturing dates are the same if the two manufacturing dates do not differ by more than a specified number of days.

\* \* \* \* \*